April 26, 1966   J. F. WOODALL ETAL   3,247,972
CENTRIFUGAL SCREENING APPARATUS
Filed Dec. 26, 1961   3 Sheets-Sheet 2

INVENTORS:
DANIEL C. GILLESPIE
JAMES F. WOODALL
BY Theodore M. Jablon
Att'y.

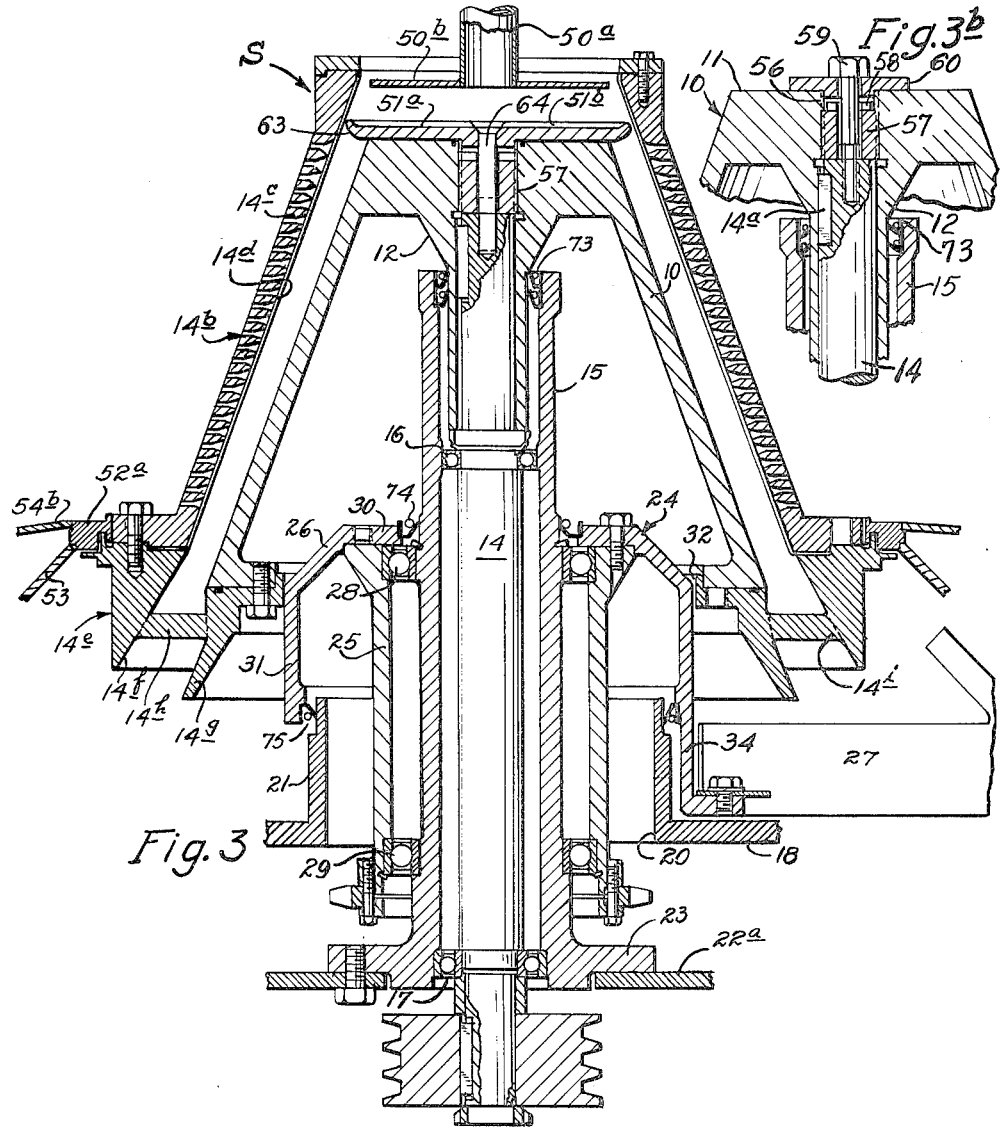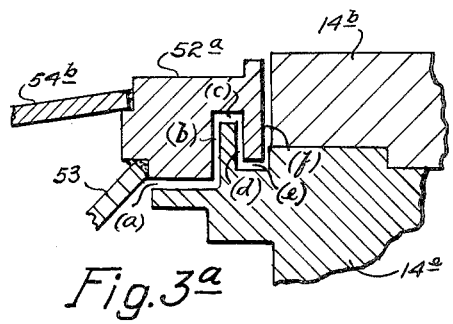

ated Apr. 26, 1966

3,247,972
CENTRIFUGAL SCREENING APPARATUS
James F. Woodall, Palo Alto, Calif., and Daniel C. Gillespie, Glenbrook, Conn., assignors to Dorr-Oliver Incorporated, Stamford, Conn., a corporation of Delaware
Filed Dec. 26, 1961, Ser. No. 162,180
7 Claims. (Cl. 210—369)

This invention relates to centrifugal screening apparatus of the continuously operating type, and more particularly to improvements rendering such apparatus suited for effective and economical separation treatment of slurries containing crystals in their mother liquor.

More in particular, the invention is concerned with the separation treatment of slurries such as are encountered in the freeze concentration of solutions, one example of which is found in the concentration of sucrose solution or natural fresh pressed fruit juices from which an amount of water is to be frozen out and separated in a form of ice.

In freeze concentration, a dilute starting solution, for example freshly pressed or extracted fruit juices, are subjected to refrigeration treatment whereby a substantial portion of the water contained in the solution is converted into ice crystals suspended in the concentrate, and the resulting slurry then subjected to centrifugal screening separation for yielding the concentrated liquor or juice concentrate passing through the screen, while the ice crystals are retained in order to be continuously discharged separately from the screen.

However, with ice crystals or other particles tending to stick together and to build up into ever bulkier ice formations or agglomerates, considerable difficulties were encountered in discharging the crystals from a conventional machine, with the result that gradual congestion due to ice accumulation brings the screen rotation to a final halt. Also, in the conventional machine there was experienced an undue escape of fine ice particles into the concentrate resulting eventually in undesirable partial redilution of the concentrate.

More particularly, in the aforementioned conventional machine, an upright conically shaped screen member is rotated about a vertical axis with slurry or pulp supplied to its narrow end from the top. With the centrifugal forces tending to hold the solids in place against the inner face of the screen member, the conventional machine normally relies upon a helical transporting screw, briefly termed the helix for positively moving the material continuously down to the wide end of the screen member for discharge into a receiving chamber or hopper or the like. The housing of the machine has a suitably shaped annular partition defining a lower solids receiving chamber and an upper chamber receiving the filtrate or concentrate passing centrifugally through the screen, with free-running clearance provided between this partition and the lower edge portion of the rotating screen. The helix cooperating with the inner conical surface of the screen is usually part of a conical member rotated coaxially with the screen although at a differential speed, with working clearance provided between the helix and the inner surface of the screen. Furthermore, the lower chamber of the conventional machine has internal structure for supporting a differential drive mechanism which in turn carries the helix and the screen concentrically with respect to one another.

In particular, in this earlier construction a radial tubular connection or horizontal tunnel structure extends between the wall of the lower housing chamber and the casing of the differential drive, providing a horizontal passage to accommodate chains or belts or similar power transmission means for driving the differential mechanism from suitably arranged outside motor means. Thus, when a freeze concentration slurry, for example refrigerated fruit juices or the like, was subjected to separation treatment in such a conventional machine, the horizontal radial tunnel located in the path of the descending crystals would constitute a base for the cumulative build-up thereon of ice crystals into bulky ice formations, which once started would continue to grow in all directions until finally the rotation of the screen itself was thereby stopped.

Moreover, windage caused by the rotation of the helix member appeared to be responsible for creating excess pressures in the lower receiving chamber effective to encourage the transfer and escape of fine or comminuted ice particles upwardly through the aforementioned annular running clearance around the solids discharge end of the screen assembly, thereby contributing to undesirable redilution of the concentrate.

In view of the above indicated operating difficulties and obstacles to continuous operation encountered in the separation treatment of freeze concentration slurries, it is among the objects of the invention to provide improved centrifugal screening apparatus so constructed and arranged that in its operation the resulting ice crystals or other particles are prevented from constituting objectionable formations in the screen discharge region of the machine, while otherwise insuring the continuous discharge of particles in substantially dispersed or discrete and relatively dry condition, preferably suited for washing to recover the film of concentrate adhering residual thereon, and/or for re-use of the crystals to effect precooling of the raw freshly pressed fruit juices preparatory to their being subjected to the crystal forming refrigeration operation.

Another object is to minimize or eliminate the aforementioned escape of ice crystals or particles into the concentrate, and thereby to eliminate the cause of redilution.

Another object is to provide a mechanism of greatly simplified construction that meets the above stated requirements of improvement especially with respect to the handling of freeze concentration slurries.

Still another object is to provide an improved and simplified machine preferably for handling the freeze concentration slurries, including certain sealing means for maintaining confined in the machine a blanket or atmosphere of an auxiliary or neutral gas, for instance nitrogen, especially where fruit juices or the like are subjected to freeze concentration and where the presence of an oxidizing environment is not desirable.

The foregoing objects are attainable because of the discovery of this invention, whereby the customary internal helix is dispensible in the separation treatment of freeze concentration slurries or the like. Thus, it was found that even at high centrifugal speeds of an upright trunco-conical screen assembly having a suitable angle of conicity the resulting centrifugal forces did not inhibit a desired rate of progress of the ice crystals downwardly over the screen surface in the absence of the customary conical transporting screw. Another unexpected aspect in this discovery was the fact that the absence of the helix did not cause uneven feed distribution relative to the screen with consequent unbalancing of the machine, when the feed slurry was fed in such a manner as to impinge upon the transverse top phase of the narrow end of an outwardly smooth and unencumbered feed cone member.

A feature, therefore lies in the provision of a unitary rotary screen assembly which comprises an upright core member preferably in the form of an outwardly smooth truncated hollow cone herein termed the feed cone member, an upright trunco-conical screen member surrounding the feed cone member in concentrically spaced relationship therewith, and a rim member rigidly inter-connecting the lower ends of the two concentric conical members while providing ample passage area for the downward discharge of retained material from the screen.

In addition, the above objects are attainable by way of an improved structural arrangement whereby the aforementioned radial tunnel is eliminated from the path of the crystals that issue from the bottom end of the screen.

Hence, one embodiment of the improved construction teaches an arrangement wherein the screen assembly delivers the retained matter unobstructedly onto a platform member where rotating scraper means convey it to an outlet means or discharge zone communicating with horizontal conveying means preferably of the screw conveyor type located directly underneath, and independent drive means respectively for the screen assembly and for the scraper means also extend underneath the platform member, providing respectively a high speed and a low speed of rotation.

More specific features of the improved construction lie in the provision of special feed baffle means at the top of the feed cone member, also in the provision of certain annular labyrinth seal means associated with the bottom end of the trunco-conical screen assembly, of gas sealing means effective to maintain in the machine a desired inert or non-oxidizing gaseous atmosphere, and also in certain arrangements of the screw conveyor means.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

FIG. 3 is an enlarged detail view taken from FIG. 2, showing more clearly the guide bearing arrangement and other details in the rotary screen assembly;

FIG. 3a is an enlarged detail view of a labyrinth sealing arrangement shown in FIG. 3;

FIG. 3b is an enlarged detail view of a modified top end mounting of the feed cone member;

FIG. 4 is an enlarged cross-sectional detail view of the horizontal discharge screw conveyor means of FIG. 2, illustrating more clearly the dual function of the horizontal screw;

FIG. 5 is a detail cross-sectional view taken on line 5—5 in FIG. 1, of the outwardly extending portion of the horizontal discharge screw conveyor means;

FIG. 6 is a detail view of the discharge end of the horizontal screw conveyor means, taken on line 6—6 of FIG. 1; and FIG. 7 is a somewhat reduced side view of a discharge receiver vessel sealingly connected to the discharge end portion of the horizontal screw conveyor.

Figure 1:
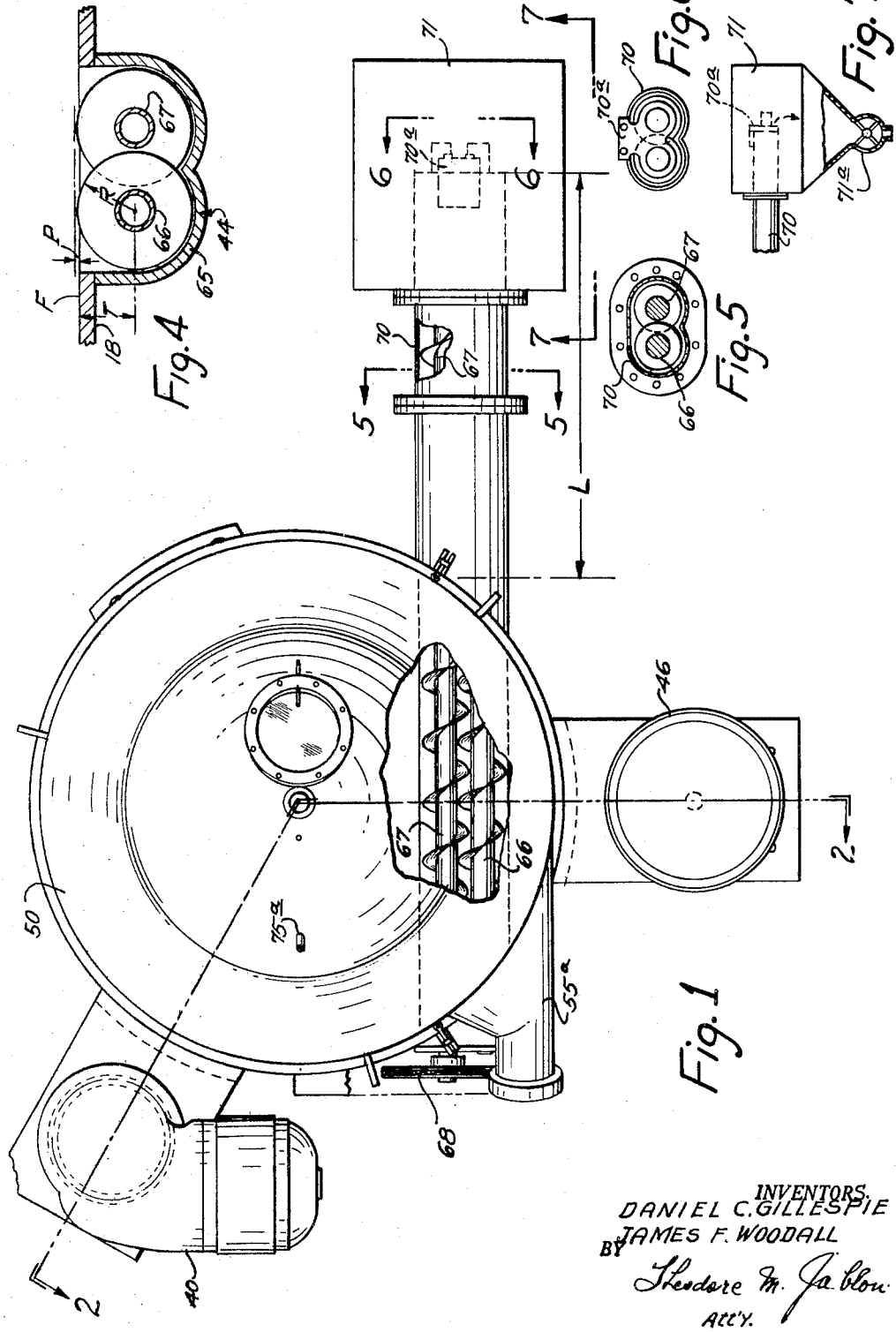
FIG. 1 is a top plan view of the improved machine according to one embodiment of the invention, featuring the smooth feed cone member together with the scraper means and horizontal screw conveyor.

The improved machine of this invention features a rotary screen assembly which comprises an upright feed cone member preferably presenting a smooth outer trunco-conical surface, a truncated screen member concentrically surrounding the feed cone member, and a composite ring member rigidly interconnecting both trunco-conical members at their bottom ends and providing passage ways for downward delivery therethrough of the material retained or rejected by the sceren. The trunco-conical screen member more particularly consists of a rigid screen cage member and a form-fitting conical screen member properly fastened to the inner surface of the cage member. Preferably, there are provided specially designed feed inlet baffle means at the top for expediting the uniform radial distribution of the feed.

When a freeze concentration slurry containing ice crystals or particles in their mother liquor, for example in the form of refrigerated fruit juices, is fed into such a screen assembly from the top, it was found that the ice crystals, even though coated with a film of residual sticky sucrose matter, would migrate at a desired steady rate downwardly upon the screen to discharge through the aforementioned downward passages, notwithstanding the great centrifugal forces set up in this screen assembly when rotated at high speed, without the benefit of the customary conical transporting screw cooperating within the screen.

Referring more particularly to FIGS. 1 to 7, the screen assembly S comprises an outwardly smooth-faced hollow feed cone member 10 which is open at the lower end but closed at the top. The upper or narrow end of this feed cone member presenting a top face 11 is formed wtih an inner downwardly extending hub portion 12 secured to the upper end of a vertical shaft 14. The fastening means comprise a key connection 14a combined with an axial top end screw bolt connection to be furthermore described below. This screen assembly furthermore comprises a screen member 14b also of truncated shape open at both ends, surrounding the feed cone member in concentric relationship therewith. More in particular, the screen member comprises a rigid trunco-conical cage member 14c having a correspondingly shaped screen element 14d mounted upon its inner face and in contacting relationship therewith. A rim member 14e rigidly inter-connects the bottom ends of these two truncated concentric members, comprising an outer ring portion 14f (FIGURE 3) fastened to the screen member and an inner ring portion 14g fastened to the feed cone member and radial ribs 14h preferably streamlined in cross-section to minimize resistance to the discharging ice, and rigidly interconnecting the two ring portions so that the open areas between the ribs provide downward passages 14i for the material or ice crystals intercepted and delivered downwardly by the screen.

The shaft 14 is mounted for rotation axially non-shiftable in a stationary vertical tubular guide member 15 by means of upper and lower bearings 16 and 17 respectively.

The tubular guide member 15 is carried by a horizontal platform member 18 provided with rigid supporting means or legs 19 whereby it is spaced a distance "D" from a supporting base. The platform member has a low peripheral wall 19a provided with flange 19b, which gives the platform member the configuration of a shallow pan. The platform member also has a central opening 20 provided with an upwardly extending cylindrical short neck or rim portion 21. The mounting means for tubular guide member 15 comprises a depending bracket structure 22 preferably formed like a depending shallow cage providing a horizontal auxiliary supporting plate 22a spaced rigidly a distance "d" from the underside of the platform member 18. The auxiliary plate 22 has rigidly connected thereto the lower end flange 23 of the tubular guide member which latter extends upwardly through the opening 20 and a substantial distance into the hollow interior of the feed cone member 10.

Rotatable about the tubular guide member 15 is a scraper assembly 24 comprising a cylindrical hub member 25, a bell shaped annular member 26 fixed to the top end of the hub member, and scraper blade means 27 carried by the bell shaped member. More particularly, the hub member 25 is mounted for rotation although axially non-shiftable upon the tubular member by means of upper and lower bearings 28 and 29 respectively (more clearly shown in FIG. 3), with the lower end portion of the hub member extending downwardly through opening 20 of the platform member into the space defined by the depending bracket structure 22. The upper end portion of the hub member 25 extends upwardly part way into the hollow of the feed cone member 10, thereby providing ample rotational stability for this assembly. The bell shaped annular member 26 has an inturned top flange 30 fastened to the top face of the hub member 25 just above the upper bearing 28, and a cylindrical skirt portion 31 in overlapping relationship with the short neck 21 on the platform member. The upper portion of the bell shaped member is shown to be surrounded by the bottom portion of the screen assembly with free-running clearance 32 provided between the parts. The scraper blade means 27 in this example comprise blades carried by downward extensions 34 of the bell shaped member 26, and are preferably shaped and contoured to conform to the surrounding housing structure furthermore to be described.

Drive means for effecting the rotation of the scraper assembly comprise for example a chain drive element 39 extendnig horizontally directly beneath the platform member in driving engagement with the lower end portion of the hub member 25. An independent source of driving power in this embodiment is a motor reducer unit 40 mounted upon a bracket 41 extending radially outwardly from the support means of the platform member, to provide the relatively slow rotation for the scraper means.

Rotation of the scraper assembly will cause the crystals on the platform member to be conveyed and delivered to a discharge zone or outlet opening 43 for further handling as by horizontal screw conveyor means 44 furthermore to be described below.

Drive means for the screen assembly comprises for example a horizontal multiple V-belt drive 45 engaging the lower end portion of the shaft 14 at a level below that of the chain drive element 39 and of the screw conveyor means 44, and located directly below the depending bracket structure 22.

An independent source of power for the V-belt drive in this embodiment is a motor 46 mounted upon a bracket 47 extending, like the aforementioned motor bracket 41, radially outwardly from the leg structure that supports the platform member on a base.

The screen assembly is surrounded by a bell shaped housing structure 50 provided with a bottom flange 51 whereby it is connected to the flange 19b of the platform member described above. A feed inlet pipe 50a is carried by the housing member at the top, which pipe in turn carries a horizontal circular baffle 50b surrounded by the top end of the screen member and vertically spaced from and cooperating with the top face of the feed cone member or else with the baffle member 51a thereon, and with the spacing fixed or adjustable. The housing member is further provided with an internal annular shelf construction 52 the inner edge portion of which is formed by a ring or internal rim 52a. This rim has a specially contoured cross-sectional configuration constituting the stationary part of a labyrinthic seal device, cooperating with a complementary rotating part formed by the aforementioned bottom rim member 14e of the screen assembly, the details of the labyrinth device to be furthermore described below.

The shelf construction 52 comprises a first annular trunco-conical member 53 of relatively thin sheet material having its bottom edge welded to an inturned portion of flange 51 of the housing member, while its top edge is welded to the stationary rim 52a of the labyrinth device. Another annular member 54 of similar thin sheet material also a part of the shelf construction is specially contoured comprising a frusto conical intermediate body portion 54a, a substantially horizontal top end portion 54b inturned from the upper end of the intermediate portion and welded to the labyrinthic rim 52a, and an annular channel portion 54c merging with the lower end of the intermediate portion and outwardly tangentially joining the surrounding wall of the housing member. In this way, the shelf construction defines an upper annular chamber 55 for receiving the filtrate or fruit juice concentrate that is centrifugally forced through the screen and having a discharge connection 55a, and a lower annular chamber 55b receiving the material or ice crystals that have been intercepted by the screen.

The above mentioned labyrinth seal device most clearly shown in the enlarged detail of FIG. 3a, provides between the stationary rim 52a and the rotating rim member 14e a labyrinthic path which in cross-sectional view comprises a horizontal inward entry portion (a), an upward portion (b), a short inward upper horizontal portion (c), a downward portion (d), a short inward lower horizontal portion (e), and an upward exit portion (f). The cooperating labyrinth members or rims are axially adjustable relative to one another, so that the horizontal portions (a), (c), (e) of the labyrinthic path are thereby closely adjustable in an axial direction.

The means for thus adjusting the labyrinthic clearance are embodied in the top end portion of the feed cone member 10 and more particularly in the fastening means effective between the feed cone member and the supporting shaft. Referring to FIGURE 3b, for purposes of this axial adjustment, the top end of the feed cone member has internal thread 56 wherein an externally threaded abutment member 57 herein briefly termed the abutment, can be screwed up or down for instance by means of some suitable tool engaging the head lugs 58 of this abutment member. With this abutment member resting upon the top end of the shaft, screwing the abutment downwardly will raise the feed cone member and thus the entire screen assembly, while screwing the abutment member upwardly will correspondingly lower the entire screen assembly. In this way, there is attainable a close adjustment with respect to the aforementioned horizontal labyrinthic clearances (a), (c), (e) (see detail FIG. 3a), while the vertical clearances (b), (d), (f) remain the same.

Once this axial adjustment has been made, it is only necessary to apply and tighten the screw bolt 59 threaded axially into the top end of the shaft, and thereby forcing an annular member or washer 60 into tight pressure engagement with the top face 11 of the feed cone member (see detail FIG. 3b), thereby firmly securing the parts together while key connection 14a is effective between the feed cone member and the shaft to impart driving torque to the feed cone member 10.

However, in the embodiment of FIG. 3, the fastening means include the disc shaped feed distributing baffle member 51a preferably having a flat body portion and a slightly upturned or dished peripheral portion constituting a marginal overhang relative to the top face of the feed cone member and determining the width of an annular feed passage 63. A screw bolt 64 may be rigidly connected or welded to this disc baffle member, thereby in effect constituting a greatly enlarged head portion of the bolt, or else the bolt may be turnable in the disc so it can be individually tightened into the shaft to effect secure pressure engagement between the baffle member and the top face of the feed cone member.

For the purposes of this invention, the enclosed angle of conicity of both the feed cone and the screen member may be such as to insure effective centrifugal separation as well as a suitable rate of downward movement of the intercepted crystals on the screen, and also a continuous uninhibited delivery thereof onto the aforementioned platform member for further disposal by the scrapers and then by the horizontal screw conveyor means 44.

In FIGS. 1 to 7, the aforementioned screw conveyor means 44 comprise a conveyor trough 65 which may be welded to the underside of the platform member in communication with the discharge zone thereof. The trough is preferably shaped to accommodate a pair of horizontal conveyor screws 66 and 67 arranged in parallel side by side cooperative relationship. These conveyor screws are rotatable in synchronism in directions opposite to one another and preferably so as to rotate towards each other at the bottom, with the respective conveyor flights cooperating in view of their mutually overlapping relationship as shown. Drive means for effecting this rotation are shown to comprise a chain drive 68 or the like actuated by a motor unit 69.

This twin conveyer screw arrangement may extend laterally a distance beyond the platform structure, indicated by the length "L," enclosed in a corresponding length of tubular casing 70 with end bearing 70a for the conveyer screws, to deliver the material into a suitable receiver here indicated by the closed chamber 71 and discharge starwheel 71a.

The screw conveyer in this embodiment incorporates a special feature more clearly illustrated in detail FIG. 4, in that the shafts of the conveyer screws are spaced from the top face "F" of the platform member a distance "T" slightly smaller than the radius "R" of the conveyer flights. Thus, the conveyer flights project a slight distance "P" above the top face "F" with the result that a sheath of ice which tends to form and close the outlet opening or discharge zone covered by the scraper blades is broken up immediately by the action of the flights while pushing the ice crystals towards the point of discharge from the trough.

Provision is herein made for allowing the machine to be operated as a closed system wherein an inert gas atmosphere, for instance in the form of nitrogen, is maintainable if desired as in fruit concentration. To that end, liquid and gas sealing means are provided for those rotating parts of the machine where otherwise communication would exist between the interior of the machine and the outer atmosphere. Also, the feed inlet means and the discharge means for the juice concentrate and those for the intercepted ice crystals are sealed against the atmosphere. The discharge seal for the ice crystals is illustrated in that the laterally extending closed conveyor casing is sealingly connected to the closed receiver 71 from which the atmosphere is excluded as by a starwheel 72 or other sealingly operating discharge devices.

The driven rotating parts of the machine are provided with ring sealing devices 73, 74, and 75 whereby sealing relationship is attained respectively between the feed cone shaft and the surrounding tubular guide member 15, between the tubular guide member and the surrounding rotating hub member 25 of the scraper structure, and between the hub member and the surrounded neck 20 of the platform member.

A supply of a gas into the machine is indicated by a valved supply connection 75a whereby a treatment gas may be admitted into the interior of the housing member, for example nitrogen as in the case of fruit juice concentration.

Feed slurry, for example freeze concentration slurry derived from orange juice or the like substantially freed of its pulp, may be fed to the improved machine of this invention as illustrated in FIGS. 1 to 7. The slurry entering the top feed inlet end of the rotating screen assembly is confined between the stationary baffle and the top face or rotating dished baffle of the feed cone member, and is thus radially distributed in all directions onto the surrounding screen element provided with screen openings for instance in the form of holes that may be in the order of .005 diameter, this screen having an enclosed apex angle which may be in the order of 40°. With this arrangement and a suitable rotational speed of the screen assembly, the juice concentrate is forced centrifugally through the screen element, whereas the intercepted ice crystals are caused to move in uniform distribution downward upon the screen element for discharge onto the platform member, thus delivering the crystals freely in a suitable uncomminuted and relatively dry condition in which they may be washed and/or employed for pre-cooling in the freeze concentration operation.

The scrapers which are formed so as to sweep not only the top face of the platform member but also the surrounding walls thereof as well as the underside of the annular shelf, deliver the crystals to the twin screw conveyor which not only removes the crystals from the machine, but also is effective by its particular arrangement above described to maintain the discharge opening in the platform free of ice. The labyrinth seal around the bottom end of the screen assembly discourages ice particles from escaping into the filtrate compartment above the shelf and rediluting the juice concentrate. Furthermore in view of the various annular sealing devices provided between stationary and rotary parts of the machine, the separation operation may be conducted in an inert or non-oxidizing gaseous atmosphere maintainable in the machine, if the feed inlet and the outlets for the concentrate and for the crystals respectively are also kept sealed against the atmosphere.

Figure 2:
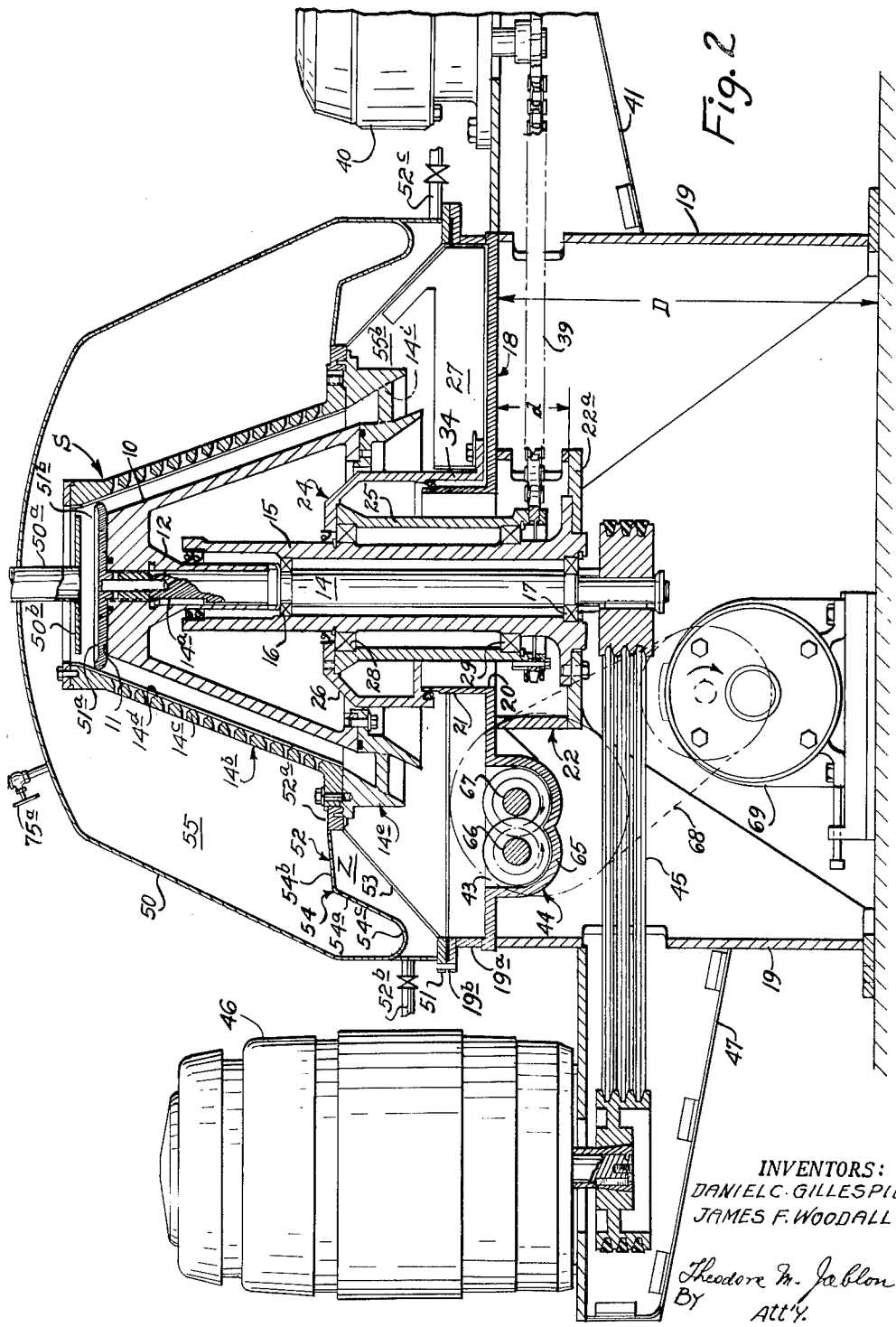
FIG. 2 is a vertical sectional view taken on line 2—2 of FIG. 1, showing the general arrangement of the parts, including the rotary scraper means, the screw conveyor means, the special top feed inlet baffle means, and certain gas sealing devices.

Reverting to FIG. 2, it is to be noted that the space Z available between the walls or parts 53 and 54 of the shelf construction 52 may be utilized for circulating therethrough a liquid medium by providing suitable inlet and outlet connections 52b and 52c to this space. By controlling the temperature of the liquid medium it is possible to influence the surface temperature of the upper shelf wall 54 and thus the temperature of the concentrated solution or juice collected in and discharging from the annular trough 54c. Similarly, one may influence the surface temperature of the lower shelf wall 53 and thus to some extent the phyiscal condition of the ice crystals or the like product discharging or flung from the lower end of the screen assembly.

Whereas the machine herein illustrated may be equipped with the influent baffle plate 51a, the preferred dished form thereof may be further be provided with low radial ribs or vanes 51b at the top in order to further expedite the uniform distribution of the feed slurry to the periphery.

From the foregoing it may be seen that the invention provides a centrifugal screening apparatus of improved structural organization whereby operating problems heretofore encountered in the centrifugal separation treatment of freeze concentration slurries or the like are avoided, and wherein particularly the continuous and uninhibited separation and discharge of the ice crystals is achieved.

We claim:

1. Centrifugal screening apparatus which comprises an upright hollow member open at the bottom but closed at the top and having a vertical downwardly extending shaft connected rigidly to the top; an upright truncoconical rigid screen member having open ends and concentrically surrounding said hollow member; structural means rigidly interconnecting the hollow member and the screen member in spaced relationship with one another and having downward passage means provided for discharging material intercepted by the screen member; a stationary horizontal platform means having a central opening through which said shaft extends and having a discharge zone for the intercepted material from said screen member; depending bracket means fixed to the underside of said platform means substantially around said central opening; a vertical tubular guide member having internally and externally arranged bearing means and being supported by and fixed to said bracket means and extending upwardly through said central opening into the interior of said hollow member in concentric relationship therewith; said vertical shaft being mounted for rotation in said internal bearing means of the tubular guide member while being secured against axial displacement in said guide member; a cylindrical hub member surrounding said tubular guide member and extending through said central opening and being rotatably mounted on said external bearing means while being secured against axial displacement on said guide member; scraper means carried outwardly by said hub member; slow independent drive means engaging the lower end of said cylindrical hub member at a level beneath the plane of said platform means for causing said scraper means to convey intercepted material on said platform means to said discharge zone; fast independent drive means engaging the lower end of said shaft at a level below said depending bracket means; said platform means being of circular configuration; said discharge zone being provided by an opening in said platform means; a horizontal conveyer trough supported at the underside of said platform means and cooperatively associated with said opening for receiving the intercepted material conveyed by said scraper means; and a pair of parallel cooperating conveyer screws located side by side in said trough and mounted for rotation in respective directions opposite to each other for removing the material from the screening apparatus, said trough and conveyer screws extending along a line corresponding to a secant of the platform means.

2. Centrifugal screening apparatus which comprises an upright hollow member open at the bottom but closed at the top and having a vertical downwardly extending shaft connected rigidly to the top; an upright trunco-conical rigid screen member having open ends and concentrically surrounding said hollow member; structural means rigidly interconnecting the hollow member and the screen member in spaced relationship with one another and having downward passage means provided for discharging material intercepted by the screen member; a stationary horizontal platform means having a central opening through which said shaft extends and having a discharge zone for the intercepted material from said screen member; depending bracket means fixed to the underside of said platform means substantially around said central opening; a vertical tubular guide member having internally and externally arranged bearing means and being supported by and fixed to said bracket means and extending upwardly through said central opening into the interior of said hollow member in concentric relationship therewith; said vertical shaft being mounted for rotation in said internal bearing means of the tubular guide member while being secured against axial displacement in said guide member; a cylindrical hub member surrounding said tubular guide member and extending through said central opening and being rotatably mounted on said external bearing means while being secured against axial displacement on said guide member; scraper means carried outwardly by said hub member; slow independent drive means engaging the lower end of said cylindrical hub member at a level beneath the plane of said platform means for causing said scraper means to convey intercepted material on said platform means to said discharge zone; fast independent drive means engaging the lower end of said shaft at a level below said depending bracket means; said discharge zone being provided by an opening in said platform means; a horizontal conveyer trough supported at the underside of said platform means and cooperatively associated with said discharge zone for receiving the intercepted material conveyed by said scraper means; and a pair of parallel cooperating conveyer screws located side by side in said trough and mounted for rotation in respective directions opposite to each other effective to remove the material from the screening apparatus, said conveyer screws being so constructed and arranged that the edge portion of at least one of the conveyer flights extends into substantially tangential relationsihp with respect to the plane defining the top face of said platform means.

3. A centrifugal screening apparatus which comprises, an upright hollow member closed at the top but open at the bottom; an upright trunco-conical screen member having open ends, concentrically surrounding said hollow member in spaced relationship therewith; structural means rigidly interconnecting the hollow member and the screen member, with downward discharge passages provided for discharging material intercepted by the screen; a stationary horizontal platform means having a central opening provided with an upward rim, depending bracket means fixed to the underside of said platform member substantially around said central opening, and also having a discharge zone for the material from said screen member; a vertical tubular guide member having internally and externally arranged bearing means, supported by and fixed to said bracket means and extending upwardly through said opening and through said upward rim in concentric relationship therewith; a vertical shaft mounted for rotation in said internal bearing means of the tubular guide member and fixed to the top end of said hollow member while secured against axial displacement in said guide member; a cylindrical hub member surrounding said tubular guide member and rotatable thereon through said external bearing means, and extending through said opening and through said upward rim of the platform means while secured against axial displacement on said tubular member; an anular bell shaped member surrounding the upper end portion of said rotary hub member and connected to the upper end thereof and extending downwardly around said upward rim of the platform means; scraper means carried outwardly by said bell shaped member; slow independent drive means engaging the lower end of said cylindrical hub member at a level beneath the plane of said platform member for causing said scraper means to convey the intercepted material to said discharge zone; fast independent drive means engaging the lower end of said shaft at a level below said depending bracket means; a housing member surrounding said screen member and fastened marginally to said platform member in gas-sealing relationship therewith, and provided internally with an annular shelf surrounding the lower end portion of said screening member to collect liquid passing through the screen, with lateral outlet means provided for the liquid; gas sealing means comprising a first ring seal means effective between said bell shaped annular member and said upward rim of the platform member, a second ring seal means effective between said bell shaped member and an intermediate portion of said tubular guide member, a third ring seal means effective between said shaft and said tubular guide member; inlet means sealed against the outer atmosphere for introducing a feed slurry supply to the screening member, and discharge means sealed against the outer atmosphere for delivery rejected material from the screening appaartus; and means for supplying a gas to the interior of the housing member.

4. The apparatus according to claim 3, wherein said discharge means for the intercepted material comprise a conveyer trough supported at the underside of the platform means and cooperatively associated with said opening in sealed relationship therewith for receiving the intercepted material conveyed by said scraper means, conveyer screw means rotatable in said trough, and sealed receiver means sealingly connected to the end portion of said discharge trough for receiving the material delivered by said discharge means sealed against the outer atmosphere.

5. The apparatus according to claim 3, with the addition of a circular feed impact baffle member detachably secured to the top face of said upright hollow member in concentric relationship therewith, said baffle member being of a diameter greater than that of the top face of said hollow member and thus forming a marginal overhang with respect thereto, and an annular feed baffle carried by and surrounding the lower end of said feed inlet means and in turn surrounded by the top end portion of said screening member.

6. The apparatus according to claim 3, with the addition of an annular labyrinth sealing means effective between said annular shelf and the lower end portion of said screening member.

7. The apparatus according to claim 3, wherein said structural means comprise a rim member providing the sole torque transmitting connection between said hollow member and said screen member, said rim member having an inner ring portion rigidly connected to the wide bottom end of said hollow member, and having an outer ring portion rigidly connected to the wide bottom end of said screen member, and having radial portions rigidly interconnecting said outer and inner ring portions and thus providing free downward passage area between said radial portions for the material discharging from the screen.

References Cited by the Examiner

UNITED STATES PATENTS

| | | | |
|---|---|---|---|
| 934,000 | 9/1909 | Massen | 210—369 |
| 1,893,941 | 1/1932 | Zeleznial | 210—377 X |
| 2,043,661 | 6/1936 | Howe | 210—377 X |
| 2,096,594 | 10/1937 | Samchez Y Cil | 210—369 X |
| 2,301,901 | 11/1942 | McKinnis | 210—369 X |
| 2,324,933 | 7/1943 | Jones | 210—369 X |
| 2,351,330 | 6/1944 | Goetz | 210—369 X |
| 2,370,353 | 2/1945 | Howe | 210—377 X |
| 2,455,284 | 11/1948 | Van Riel | 210—374 |
| 2,636,284 | 4/1953 | Napier | 198—213 X |
| 2,727,631 | 12/1955 | Pate | 210—369 |
| 2,750,040 | 6/1956 | Strich | 210—369 X |
| 2,932,401 | 4/1960 | Tholl | 210—369 |
| 3,011,647 | 12/1961 | Elsken | 210—377 X |

ROBERT F. BURNETT, *Primary Examiner.*

REUBEN FRIEDMAN, *Examiner.*